United States Patent [19]

Chaudhury et al.

[11] Patent Number: 4,737,562

[45] Date of Patent: Apr. 12, 1988

[54] SELF-ADHERING POLYORGANOSILOXANE ELASTOMER COMPOSITIONS AND METHOD FOR PREPARING SAME

[75] Inventors: Manoj K. Chaudhury; John H. Gaul, both of Midland, Mich.

[73] Assignee: Dow Corning Corporation, Midland, Mich.

[21] Appl. No.: 919,164

[22] Filed: Oct. 15, 1986

[51] Int. Cl.$^4$ ............................................. C08G 77/06
[52] U.S. Cl. ...................................... 528/15; 528/14; 528/16; 528/18; 528/21; 528/17; 528/23; 528/33; 528/34; 528/35; 528/38
[58] Field of Search .................. 528/35, 33, 34, 38, 528/15, 14, 16, 21, 23, 18, 17

[56] References Cited

U.S. PATENT DOCUMENTS

| | | |
|---|---|---|
| 3,509,081 | 4/1970 | Gignac, Jr. |
| 3,699,072 | 10/1972 | Clark et al. |
| 3,772,066 | 11/1973 | Clark et al. |
| 4,087,585 | 5/1978 | Schulz |
| 4,245,079 | 1/1981 | Matsumoto et al. |
| 4,311,739 | 1/1982 | Hardman et al. |
| 4,460,639 | 7/1984 | Ashby |
| 4,525,400 | 6/1985 | Suprenant |
| 4,652,624 | 3/1987 | Allen et al. ................. 528/34 |

FOREIGN PATENT DOCUMENTS 1524790 9/1978 United Kingdom .

*Primary Examiner*—Melvyn I. Marquis
*Attorney, Agent, or Firm*—Robert Spector

[57] ABSTRACT

Polyorganosiloxane compositions yielding cured elastomers exhibiting cohesive bonding to inorganic substrates contain as the adhesion promoter the combination of (1) a 1,2- bis(trialkoxysilyl)ethane of the general formula $(RO)_3SiCH_2CH_2Si(OR)_3$ where R represents an alkyl or haloalkyl radical containing from 1 to 8 carbon atoms, (2) an organosilicon compound containing at least one hydroxyl group or a hydrolyzable precursor thereof and at least one group that reacts at ambient temperature with the alkoxy groups of the silylethane or with the curable polyorganosiloxane composition, and (3) a catalyst for the reaction of the adhesion promoter ingredients.

Preferred compositions are cured at room temperature by a platinum catalyzed hydrosilation reaction and are applied to metallic substrates that have not been cleaned or otherwise treated prior to application of the composition.

12 Claims, No Drawings

SELF-ADHERING POLYORGANOSILOXANE ELASTOMER COMPOSITIONS AND METHOD FOR PREPARING SAME

BACKGROUND OF THE INVENTION

1. Field of the Invention

This invention relates to polyorganosiloxane elastomer compositions. More particularly, this invention relates to curable polyorganosiloxane elastomer compositions capable of being cohesively bonded to various substrates, including those coated with organic impurities such as oils and greases. The bonding is achieved by means of a novel two-component liquid adhesion promoter composition.

2. Description of the Prior Art

One of the desirable properties of polyorganosiloxane elastomers, also referred to as silicone elastomers, is the ability of these materials to resist degradation and/or solubilization in the presence of heat and a variety of chemicals. It is therefore understandable that silicone elastomers have been used as protective coatings on a variety of organic and inorganic substrates. A shortcoming of many silicone elastomer compositions, particularly those cured at room temperature by a platinum catalyzed hydrosilation reaction is their poor adhesion to some metals, particularly aluminum.

It is known to add various organosilicon compounds to curable polyorganosiloxane compositions, particularly silicone elastomers, to achieve cohesive bonding between the cured elastomer and an organic or inorganic substrate. For example. U.S. Pat. No. 4,460,739. which issued to Ashby on July 17, 1984, discloses using maleamidyl substituted trialkoxy-or triacyloxysilanes for this purpose.

The use of partial hydrolysis products of aliphatically unsaturated alkoxysilanes such as vinyltrialkoxysilanes, as adhesion promoters for compositions comprising a vinyl terminated polyorganosiloxane, an organohydrogensiloxane crosslinking agent and a platinum catalyst is taught in U.S. Pat. No. 4,311,739, which issued to Hardman and Dujak on Jan. 19, 1982.

Imparting adhesion to polyorganosiloxane compositions that are curable to silicone elastomers using a platinum-catalyzed hydrosilation reaction by incorporating certain silicon-bonded reactive groups such as ester, epoxy or trialkoxysilylalkyl group into the ethylenically unsaturated polyorganosiloxane reactant is described in U.S. Pat. No. 4,245,079, which issued to Matsumoto and Murai on Jan. 13, 1981. When the reactive group is trialkoxysilylalkyl, the ethylenically unsaturated polyorganosiloxane reactant exhibits repeating units of the general formula—$OSi(CH_3)[RSi(OR')_3]$, where R is alkylene and R' is alkyl.

The use as adhesion promoters of organohydrogensiloxanes containing at least two silicon bonded hydrogen atoms per molecule and an average of at least one unit of the formula $(RO)_3Si(CH_2)_x(CH_3)SiO$ and/or $(RO)_3Si(CH_2)(CH_3)_2SiO_{\frac{1}{2}}$ where R represents methyl, ethyl or $CH_3C(O)$- and x is 2 or 3 is taught in U.S. Pat. No. 3,772.066, which issued to Clark and Hays on Nov. 13, 1973. The adhesion promoters are used in polyorganosiloxane compositions that are curable by a platinum catalyzed hydrosilation reaction.

British Pat. No. 1,524,790, which issued on Sept. 13, 1978, teaches using a bis(trialkoxysilyl)alkane such as 1,2- bis(trimethoxysilyl)ethane as a binding medium to increase the compressive strength of mortar and other inorganic building materials.

The prior art also teaches using mixtures of two or more organsilicon compounds to achieve cohesive bonding between silicone elastomers and various substrates. Adding the combination of (1) a polyorganosiloxane containing a hydroxy group and a vinyl radical and (2) an epoxysilane to a silicone elastomer composition that is curable by a platinum catalyzed hydrosilation reaction is taught in U.S. Pat. No. 4,087,585 that issued to Schulz on May 2. 1978. The disadvantage of this combination as an adhesion promoter is that the curable composition must typically be heated to temperatures of at least 100 degrees C. to overcome the inhibiting effect of the adhesion promoter on the curing reaction.

U.S. Pat. No. 4,525,400, which issued on June 25, 1985 to Supernant, teaches an adhesion promoter for one-package, moisture curable compositions containing alkoxysilanes and/or acyloxysilanes as the crosslinking agent. The adhesion promoter is a cyclic organosiloxane wherein the silicon atoms are bonded to a group of the formula—RSiOR', the same group present in the polyorganosiloxanes described in the aforementioned patent to Matsumoto et al. R' can represent either alkyl, as in the case of Matsumoto et al.. or acyl. The—R-SiOR' group is part of an adhesion promoter that is present in addition to the principal reactants of the moisture curable composition. In the compositions of Matsumoto et al. this group is present on an ethylenically unsaturated polyorganosiloxane that reacts with an organohydrogensiloxane in the presence of a platinum hydrosilation catalyst to form the silicone elastomer.

The adhesion promoters of Supernant are prepared by the reaction of a cyclic alkylhydrogensiloxane with an ethylenically unsaturated trialkoxy- or triacyloxysilane such as vinyltrimethoxysiloxane. The data in the examples of this patent demonstrate that the inventive adhesion promoter does not effectively bond a moisture cured silicone elastomer to Alclad(R) aluminum after the elastomer has cured for 10 days under ambient conditions. Under these conditions only 10 percent of the elastomer initially in contact with the substrate remained on the substrate when the elastomer layer was peeled away from the substrate. This value increased to 90 percent when the elastomer was allowed to cure for 25 days under ambient conditions after being applied to the substrate. In no instance did this value reach 100 percent using an Alclad aluminum substrate.

Supernant compares one of his inventive cyclosiloxanes with the corresponding linear polydiorganosiloxane containing an average of 20 repeating units per molecule. The silicon atoms are bonded to the same groups as in the inventive compound. In many instances the peel strength values reported for the two compounds are similar.

The peel adhesion tests reported by Supernant were conducted in accordance with ASTM test method No. C-794. In accordance with this method the test surfaces of the substrate must be cleaned with "methyl ethyl ketone or similar solvent" followed by an optional cleaning with a detergent solution before being coated with the material to be evaluated. Up until now it has been found difficult to cohesive bond room temperature curable silicone elastomers, particularly those formed by the platinum catalyzed reaction between an ethylenically unsaturated polyorganosiloxane and an organohydrogensiloxane, if the substrate surface to be coated has not been previously cleaned with an organic solvent to remove organic impurities and contaminants such as oil and grease.

One objective of this invention is to provide adhesion promoters that cohesively bond cured silicone elastomers to inorganic substrates, particularly those coated with organic impurities.

A second objective of this invention is to provide room temperature curable polyorganosiloxane compositions that cohesively bond to inorganic substrates, particularly metals, in the cured form.

SUMMARY OF THE INVENTION

The curable polyorganosiloxane compositions of this invention contain as the adhesion promoter the combination of (1) a 1,2- bis(trialkoxysilyl)ethane of the general formula $(RO)_3SiCH_2CH_2Si(OR)_3$ where R represents an alkyl or haloalkyl radical containing from 1 to 8 carbon atoms, (2) an organosilicon compound containing at least one hydroxyl group or a hydrolyzable precursor thereof and at least one group that reacts at ambient temperature with the alkoxy groups of the silylethane or with the curable polyorganosiloxane composition, and (3) a catalyst for the reaction of the adhesion promoter ingredients.

Combining bis(trialkoxysilyl)alkanes with conventional silane coupling agents to improve the adhesion imparted by the coupling agents when used as primers or additives to adhere organic polymers to inorganic substrates such as metals, siliceous fillers and reinforcing agents is disclosed in copoending U.S. patent application Ser. No. 880,528, filed in the name of Edwin Plueddemann on June 30, 1986.

DETAILED DESCRIPTION OF THE INVENTION

This invention provides a composition which reacts to form a cured silicone elastomer capable of cohesively bonding to inorganic substrates, said composition comprising the product obtained by blending to homogeneity A. A curable polyorganosiloxane, B. A crosslinking agent for curing said polyorganosiloxane, and C. a liquid adhesion promoter that is miscible with (A) and (B) and consists essentially of (1) a first organosilicon compound of the general formula $(RO)_3SiCH_2CH_2Si(OR)_3$, where R represents an alkyl or haloalkyl radical containing from 1 to 8 carbon atoms, inclusive;

(2) an second organosilicon compound containing in each molecule at least one silicon-bonded group represented by X and at least one silicon-bonded group represented by Y, where X represents hydroxyl or a group that is hydrolyzable to a hydroxyl group, Y is selected from the group consisting of X, hydrogen and organofunctional radicals and reacts with said curable polyorganosiloxane and/or said crosslinking agent in the presence of a catalyst; and (3) a catalyst for the reactions of said X group with said substrate or the alkoxy groups of said first organosilicon compound and the reaction of said Y group, with the proviso that said second organosilicon compound is not represented by said general formula, and said organofunctional radicals are bonded to silicon by means of a silicon-carbon bond.

This invention also provides a method for promoting the adhesion of a cured silicone elastorer to an inorganic substrate, said method comprising incorporating into the corresponding curable elastomer composition a compatible liquid adhesion promoter composition consisting essentially of the product obtained by blending to homogeneity 1. a first organosilicon compound of the general formula $(RO)_3SiCH_2CH_2Si(OR)_3$, where R represents an alkyl or haloalkyl radical containing from 1 to 8 carbon atoms. inclusive;

2. an second organosilicon compound containing in each molecule at least one silicon-bonded group represented by X and at least one silicon-bonded group represented by Y, where X represents hydroxyl or a group that is hydrolyzable to a hydroxyl group, Y is selected from the group consisting of X, hydrogen and organofunctional radicals and reacts with said curable polyorganosiloxane and/or said crosslinking agent in the presence of a catalyst; and 3. a catalyst for the reactions of said X group with said substrate or the alkoxy groups of said first organosilicon compound and the reaction of said Y group with the ingredients of said curable silicone elastomer composition, with the proviso that said second organosilicon compound is not represented by said general formula, and said organofunctional radicals are bonded to silicon by means of a silicon-carbon bond.

In a preferred embodiment of the present invention the elastomer composition is curable at room temperature, typically from about 25 to about 30 degrees C., by a platinum catalyzed hydrosilation reaction, the adhesion promoter compositions function within this temperature range, the molar ratio of the aforementioned first organosilicon compound to the second organosilicon compound is from 0.1 to 2.5, and the substrate is metallic.

As used herein the term "cohesive bonding" refers to a bond that is stronger than the cured silicone elastomer. When an attempt is made to peel the elastomer away from the substrate to which it is adhered, separation ultimately occurs within the elastomer layer rather than at the interface between the elastomer and the substrate.

The term "room temperature curable composition" is intended to include polyorganosiloxane compositions that cure either by a platinum catalyzed hydrosilation reaction or by the reaction in the presence of moisture of a hydroxyl-containing polyorganosiloxane with a organosilicon crosslinker containing at least three silicon-bonded hydrolyzable groups per molecule. The hydrolyzable groups include alkoxy, aminoxy, amidoxy and ketoxime, and the moisture curable compositions typically contain a catalyst for promoting the curing reaction.

The feature that distinguishes the present adhesion promoters from prior art materials is the ability of the present promoters to act at room temperature to cohesively bond a cured silicone elastomer to a metallic substrate wherein the substrate surface to be bonded contains a layer of liquid or semi-solid organic material that would interfere with the cohesive bonding of silicone elastomer compositions containing prior art adhesion promoters. The organic material may have been deposited on the surface of the substrate during fabrication or during the time interval between fabrication and application of the curable silicone elastomer composition.

Impurities and contaminants that can be present on metal substrates include but are not limited to oils used to facilitate processing of metals, dirt particles. fingerprints, and residues of organic and inorganic materials with which the substrate came into contact between the time it was fabricated and when it was contacted with a curable silicone elastomer composition of this invention.

Before a room temperature cured silicone elastomers containing a typical prior art adhesion promoter such as partially hydrolyzed vinyltrimethoxysilane can be cohesively bonded to a metallic substrate, the surface of the substrate on which adhesion is to occur typically must be cleaned by soaking the substrate in a warm phosphate based detergent to remove the layer of impurities and/or contaminants referred to hereinabove. A less thorough cleaning can be achieved by wiping the surface with an organic solvent such as acetone.

The 1,2-bis(trialkoxysilyl)ethane (ingredient A) present in the adhesion promoter compositions of this invention is believed responsible for the ability of these compositions to cohesively bond a cured silicone elastomer to a metal surface that is coated with the aforementioned layer of impurities or contaminants.

The present inventors found that ingredient A alone is not an effective adhesion promoter for room temperature curable compositions at concentrations of up to about one percent by weight, based on the weight of the curable silicone elastomer composition, when the aforementioned layer of impurities is present at the elastomer/substrate interface.

At higher concentrations ingredient A functions as a poor adhesion promoter. i.e., it will not promote cohesive bonding. The accompanying examples demonstrate that the strength of the resultant bond is considerably weaker than can be achieved using ingredient A in combination with the silicon compounds described hereinafter as ingredient B.

While not wishing to be bound by this theory, it appears that ingredient A possesses the unique ability to penetrate and/or solubilize the aforementioned interfacial layer of impurities and form a first a physical bond and subsequently a chemical bond with the substrate material. Once this layer has been penetrated, the second of the two organosilicon compounds (ingredient B) is able to reach and react with the substrate surface to achieve cohesive bonding between the silicone elastomer and the substrate.

Ingredient A is a 1,2-bis(trialkoxysilyl)ethane, and can be represented by the general formula $(RO)_3SiCH_2CH_2Si(OR)_3$, where R represents an alkyl or haloalkyl radical containing from one to about eight carbon atoms. Surprisingly it has been found that higher homologs of ingredient A where the ethylene radical is replaced by a propylene or hexylene radical will not function in the same manner as the compounds of this invention.

The identity of the R hydrocarbon radicals in a specific embodiments of ingredient A will be determined, at least in part, by the requirement that ingredients A and B of the present adhesion promoter composition be compatible with one another and with the curable silicone elastomer composition in order for these ingredients to jointly function in accordance with the present invention. It will be understood by those skilled in the art that the probability of two or more organosilicon compounds being compatible is greatest when at least a majority and preferably all of the silicon bonded hydrocarbon radicals present in the compounds are identical or differ by no more than one or two carbon atoms.

In preferred embodiments of ingredient A, R is lower alkyl containing from one to four carbon atoms, haloalkyl containing from one to four carbon atoms or phenyl. Most preferably R is methyl, 3,3,3-trifluoropropyl or a mixture thereof. When at least 75 mole percent of the silicon bonded hydrocarbon radicals present in the curable silicone elastomer composition are methyl a particularly preferred embodiment of ingredient A is 1,2-bis(trimethoxsilyl)ethane.

Ingredient B is a silicon compound containing at least one silicon bonded hydroxyl or a hydrolyzable precursor thereof, represented by X, and at least one group represented by Y. As disclosed hereinabove, the X group is believed to react with the substrate or the alkoxy groups of ingredient A in the presence of a catalyst (referred to hereinafter as ingredient C) that constitutes the third required constituent of the present liquid adhesion promoter compositions. Under the same conditions the Y group reacts with at least one ingredient of the curable silicone elastomer composition.

When the group represented by X is not hydroxyl, it reacts in the presence of moisture, usually in the presence of a catalyst, to form a hydroxyl group. Silicon bonded hydrolyzable groups include but are not necessarily limited to halogen atoms. hydrogen atoms. alkoxy groups and carboxyl groups. Preferably the hydrolysis of the X group occurs at room temperature.

The group represented by Y is bonded to a silicon atom of ingredient B and is reactive with the ingredients of the curable silicone elastomer composition. Depending upon the curing mechanism of the elastomer composition, Y can represent a hydrolyzable group as defined hereinabove for X, hydrogen or an organofunctional radical.

As used in connection with ingredient B, organofunctional radicals typically contain a reactive group that is bonded to silicon by means of a silicon-carbon bond. Preferred organofunctional radicals include ethylenically unsaturated hydrocarbon radicals such as vinyl and allyl in addition to radicals represented by the general formula $ZR'-$, where $R'$ represents alkylene containing at least three carbon atoms and Z is selected from the group consisting of acryloxy, methacryloxy, glycidoxy, mercapto, amino and N-aminoalkylamino. $R'$ is preferably n-propyl, based on the availability of the corresponding intermediates conventionally to prepare ingredient B.

A critical requirement for ingredient B is that it not inhibit curing of the polyorganosiloxane composition. In addition ingredient B must have a sufficiently low volatility that it does not evaporate from the curable composition. Volatile silanes can be used if they are first partially hydrolyzed.

If the elastomer composition is curable by a platinum catalyzed hydrosilation reaction Y is preferably vinyl, allyl or hydrogen. When the elastomer composition is curable in the presence of moisture by the reaction of a hydroxyl terminated polydiorganosiloxane with a silane containing an average of more than two silicon bonded hydrolyzable groups per molecule X and Y preferably both represent alkoxy groups.

Ingredient B includes silanes, partial hydrolysis products of individual or mixed silanes, reaction products of one or more silanes with other classes of organosilicon compounds or with organic compounds containing one or more of the aforementioned organofunctional groups and reaction products of these organic compounds with organosilicon compounds other than silanes.

The definition of ingredient B is intended to also include liquid polydiorganosiloxanes containing an average of up to about 10 repeating units per molecule.

Many of the organosilicon compounds encompassed by the foregoing definitions of ingredient B are classified by those skilled in the art as "conventional" silane coupling agents. A thorough discussion of these coupling agents is contained in a text entitled "Silane Coupling Agents" by Edwin Plueddemann (Plenum Press. New York. 1982).

It will be understood that the adhesion promoters compositions of this invention can contain two or more members from the classes of compounds defined hereinabove for ingredients A and B.

The specific classes of organosilicon compounds constituting ingredient B will now be discussed in greater detail.

Silanes and Their Partial Hydrolysis Products

In one embodiment of the present adhesion promoter compositions ingredient B is a silane corresponding to the general formula $Y_aSiX_{(4-a)}$ or $Y_aR''SiX_{(3-a)}$ where X and Y are as previously defined, a represents an integer from 1 to 3, inclusive, and R" represents a monovalent hydrocarbon radical containing from 1 to about 8 carbon atoms, with the aforementioned proviso that ingredients A and B are compatible with one another and the curable silicone elastomer composition.

In preferred silanes X represents an alkoxy group containing from 1 to about 8 carbon atoms. Most preferably X is methoxy or ethoxy, this preference being based on the compatibility of the ingredient with the curable silicone elastomer and the availability of the intermediates used to prepare ingredient B.

Preferred silanes for ingredient B include but are not limited to the following compounds:

For Moisture Curable Elastomer Compositions methyl orthosilicate
ethyl orthosilicate
methyltrimethoxysilane
methyltriethoxysilane
3-aminopropyltrimethoxysilane
3-glycidoxypropyltrimethoxysilane and
3-methacryloxypropyltrimethoxysilane It will be understood by those skilled in the art that some of these silanes are conventionally used as the crosslinking agent in moisture curable polyorganosiloxane compositions. In this instance the crosslinking agent will also function as ingredient B of the adhesion promoter, and it may therefore not be necessary to include additional crosslinker over and above the amount required to cure the composition.

For Elastomer Compositions Curable By A Hydrosilation Reaction partial hydrolyzates of vinyltrimethoxysilane,
vinyltriethoxysilane and allyltrimethoxysilane
trimethoxysilane One or more of the preferred silanes would be suitable for use in combination with curable silicone elastomer compositions wherein at least 50 mole percent of the silicon bonded hydrocarbon radicals are lower alkyl, most preferably methyl. As discussed hereinabove, partial hydrolyzates of any of these silanes either individually or as mixtures would also be suitable for use as ingredient B of the present adhesion promoter compositions.

Reaction Products of Silanes With Other Organosilicon Compounds

A second embodiment of ingredient B includes reaction products of silanes represented by the foregoing generic formulae with a stoichiometric excess of an organosilicon compound containing at least one group per molecule that corresponds to the definition for the Y substituent of ingredient B.

The organosilicon compound is preferably a polyorganosiloxane containing an average of two or more silicon atoms per molecule that are linked by oxygen atoms. The remaining valences of the silicon atoms are satisfied by monovalent hydrocarbon radicals and groups encompassed by the foregoing definition for the Y radical.

The polyorganosiloxane reactant is preferably a polydiorganosiloxane, most preferably a polydiorganosiloxane wherein each molecule contains a plurality of groups encompassed by the foregoing definition for Y. The silane reacts with only a portion of these Y radicals present on the polyorganosiloxane, leaving some of these radicals free to react with the curable silicone elastomer composition.

Specific examples of this embodiment of ingredient B include reaction products of (1) silanes corresponding to either of the two foregoing general formulae wherein X represents an alkoxy radical such as methoxy and Y represents an ethylenically unsaturated hydrocarbon radical such as vinyl with a stoichiometric excess of (2) polydiorganosiloxanes containing a plurality of silicon bonded hydrogen atoms per molecule. The resultant reaction product contains unreacted silicon bonded hydrogen atoms,

Reaction Products of Organosilicon Compounds Other Than Silanes With Organic Compounds Containing Elastomer-Reactive Groups Another embodiment of ingredient B includes reaction products of organosilicon compounds other than the silanes described hereinabove with organic compounds containing at least one Y group and at least one group that reacts with the organosilicon compound.

Organosilicon compounds that can be used to prepare this embodiment of ingredient B include hexaalkoxydisiloxanes wherein each of the alkoxy groups contains from one to eight carbon atoms, 1,2-bis(trialkoxysilyl)ethanes corresponding to the definition of ingredient A of the present adhesion promoter compositions, and cyclic or linear polyorganosiloxanes containing at least one X group per molecule and at least one functional group, represented by Z, that is capable of reacting with a functional group identified as Z' on the organic compound. The organic compound also contains at least one group encompassed by the foregoing definition for Y.

Examples of pairs of Z and Z' groups that will react with one another to form an embodiment of ingredient B are listed in the following table.

| Z | Z' |
|---|---|
| Si—alkoxy | hydroxyl |
| Si—H | vinyl or other ethylenically unsaturated hydrocarbon radical |
| Si—halogen | hydroxyl, carboxyl (—COOH) |
| Si—OH | carboxyl |

Preferred embodiments of this class of reaction products are described in copending U.S. patent application Ser. No. 844,057, filed on Mar. 26, 1986, now U.S. Pat. No. 4,659,851 in the name of Edwin P. Plueddemann.

A particularly preferred class of organosilicon compounds suitable for use as ingredient B in combination with silicone elastomer compositions that cure by a hydrosilation reaction includes reaction products of a disilylethane defined hereinabove as ingredient A of the present adhesion promoter compositions ( Z in this embodiment is Si-alkoxy) with an alcohol containing at least one ethylenically unsaturated hydrocarbon radical such as vinyl or allyl ( Z' is hydroxyl, Y is vinyl or allyl and X is alkoxy). Specific examples of this type of compound include the allyl ethers of polyhydric alcohols such as ethylene glycol. glycerine and 1,1,1-trimethylolpropane.

The relative concentrations of ingredients A and B that will effectively promote cohesive bonding when incorporated into a curable silicone elastomer composition is dependent upon a number of parameters, including the type of substrate being bonded to, the temperature at which the elastomer composition is cured, and the amount of contaminants present on the surface of the substrate.

Because it appears to be the relative concentrations of functional groups in ingredients A and B that determine the extent to which these ingredients interact, the relative concentrations of these ingredients will be expressed as molar ratios.

For compositions that are cured at room temperature the molar ratio of ingredient A to ingredient B is typically from about 0.1 to about 7. The accompanying examples demonstrate that at a molar ratio of 8 preferred room temperature cured elastomer compositions do not cohesively bond to Alclad(R) aluminum that has not been previously cleaned. The reason for this limitation is believed to be the inability of ingredient A to function as an effective adhesion promoter at a temperature of about 25 degrees C. An excess of this ingredient in a curable composition appears to actually interfere with the formation of cohesive bonding under these conditions.

Because ingredient A appears to impart cohesive bonding when used alone in compositions that are cured at temperatures of at least 50 degrees C. the relative concentrations of ingredients A and B under these conditions do not appear critical to achieving cohesive bonding with metal substrates.

The total concentration of adhesion promoter composition required to achieve cohesive bonding of a cured silicone elastomer to a substrate is likewise dependent upon a number of parameters, including the presence of impurities on the substrate surface in contact with the elastomer, the thickness of the layer of curable silicone elastomer composition, and the curing temperature of this composition. Typically the combined concentration of ingredients A and B is equal to from about 0.1 to about 10 percent by weight of the curable elastomer composition.

If the metal surface on which the silicone elastomer composition will be applied contains has a layer of organic impurities, the silicone elastomer composition typically requires from about 2 to about 10 percent by weight of adhesion promoter, based on the weight of the curable silicone elastomer composition. It will be understood that considerably less of the present adhesion promoters may be required if the substrate has been cleaned using a detergent or an organic solvent such as toluene prior to application of a curable composition of this invention. Many of the standard test methods for determining adhesion require that the substrate be cleaned using a detergent solution or at least wiped with an organic solvent prior to application of the coating material to be evaluated.

Because the reactions of ingredients A and B of the present adhesion promoter compositions with the elastomer composition and the substrate require moisture, it will be understood that the rate of these reactions will in many instances be proportional to the availability of moisture at the interface between the elastomer and the substrate. The rate of moisture diffusion, and hence the rate at which ingredients A and B react, typically varies inversely with the thickness of the elastomer layer. When the thickness of the elastomer layer exceeds about 1.5 cm. the combined concentrations of ingredients A and B should typically not exceed about 2 percent, based on the weight of the curable elastomer composition, when it is intended to cure the composition under ambient conditions.

The Catalyst (Ingredient C).

The third ingredient of the present adhesion promoter compositions is a catalyst for promoting the reaction of ingredients A and B with one another, the substrate and the curable elastomer composition. The catalyst can be any compound that will promote hydrolysis and condensation of organosilicon compounds without interfering with curing of the silicone elastomer composition. The catalyst should also be miscible with the elastomer composition in catalytic amounts. Many of the present catalysts are conventionally used in combination with alkoxysilanes in primer and coupling agent compositions.

It is known that the hydrolysis of organosilicon compounds is catalyzed by both acids and bases. Useful basic catalysts include alkali metal hydroxides and silanolates such as potassium hydroxide and lithium silanolate, organic amines, and Lewis bases such as the alkali metal carbonates and bicarbonates. Acid catalysts include mineral acids such as sulfuric and phosphoric acids, organic acids such as acetic, propanoic and methanesulfonic acids in addition to Lewis acids such as aluminum chloride, organotin compounds such as dibutyltin dilaurate and titanium compounds such as the alkyl ortho'esters. including tetrabutyl titanate.

When the present adhesion promoter compositions are used in combination with silicone elastomer compositions that are curable by a platinum catalyzed hydrosilation reaction the choice of catalyst is considerably more limited due to the susceptibility of platinum catalysts to "poisoning" by a variety of materials. including many of the commonly used catalysts for the hydrolysis of silanes and other organosilicon compounds. The aforementioned titanium compounds have been found to be particularly effective catalysts in this type of curable composition.

As disclosed hereinbefore the adhesion promoters of this invention are particularly useful in combination with compositions that cure at room temperature by a platinum catalyzed hydrosilation reaction to yield silicone elastomers. These compositions can vary in viscosity from flowable liquids to gum type elastomers. The technique and equipment used to blend ingredients A and B of the present adhesion promoter compositions with other ingredients to form the curable compositions of this invention will depend. at least in part on the viscosity of the compositions and the type of curing reaction.

Compositions curable by a platinum-catalyzed hydrosilation reaction can be one- or two part formulations exhibiting a viscosity of from about 0.1 to 100 Pa.s or higher. Alternatively. these compositions can be semi-solid gums exhibiting viscosities of 1000 Pa.s and above. The flow properties of these gums are typically expressed in terms of the depth to which a probe of specified dimensions will penetrate the material at 25° C. and under a specified loading.

Curable compositions exhibiting viscosities of about 10 Pa.s and below can be blended by stirring the ingredients until a homogeneous composition is obtained. Small batches can be mixed by hand, while larger batches typically require motor driven equipment. Higher viscosity materials are typically blended using dough type mixers that are well known for processing silicone elastomer compositions.

In addition to the reactants, crosslinking agent, curing catalyst and adhesion promoter, the curable silicone elastomer compositions of this invention can contain other ingredients typically included in prior art compositions of this type. These conventional ingredients include, but are not necessarily limited to, reinforcing and non-reinforcing fillers, stabilizers to prevent or retard degradation of the elastomer in the presence of heat or ultra-violet light, catalyst inhibitors to retard the curing reaction, pigments, flame retardants, and thermally and/or electrically conductive materials. It may also be desirable to include liquid and/or resinous polyorganosiloxanes to modify the physical properties of the cured elastomer.

The curable elastomer compositions of this invention are particularly useful coating materials for metals and other inorganic materials that typically will not bond to silicone elastomers. As discussed hereinbefore, the compositions of this invention are unique in their ability to adhere to metals, particularly Alclad ®, aluminum, that have not been previously cleaned or otherwise treated to remove liquid or semi-solid organic materials, particularly oils and greases.

Although the properties of the present adhesion promoter compositions make them ideally suited for use with room temperature curable silicone elastomer compositions, they are equally effective when incorporated into compositions that require heating at temperatures of up to about 250° C. to achieve curing at a commercially practical rate, usually within three or four hours.

The following examples are intended to demonstrate preferred embodiments of the present curable compositions, and should not be interpreted as limiting the scope of the invention defined in the accompanying claims. All parts and percentages in the examples are by weight unless otherwise indicated.

The curable silicone elastomer composition, referred to hereinafter as composition I, used in all of the examples was prepared by blending the following ingredients to homogeneity:

46.5 parts of a dimethylvinylsiloxy terminated polydimethylsiloxane having a viscosity of 0.4 Pa.s at 25 degrees C., 46.5 parts of pulverized quartz having an average particle size of 5 microns.

3.6 parts of carbon black, 3.2 parts of a trimethylsiloxy terminated polyorganosiloxane containing an average of 3 dimethylsiloxy units and 5 methylhydrogensiloxane units per molecule, 0.1 part of a chloroplatinic acid complex of divinyltetramethyldisiloxane diluted with dimethylvinylsiloxy terminated polydimethylsiloxane to provide 0.7 weight percent platinum. The preparation of the complex is described in U.S. Pat. No. 3,419,027, which issued to Willing, and 0.05 part of cyclic methylvinylsiloxanes.

The compositions were flowable at room temperature.

The substrates were panels of aluminum or other metal and measured 2.5 by 10 cm. Two or three panels were coated with each of the compositions to ensure that the results of the adhesion test were reproducible.

The substrates were coated with the curable composition by allowing the composition to flow over one surface of the substrate to a depth of about one millimeter. Unless otherwise indicated the metal plates were not cleaned or otherwise treated prior to being coated with the curable composition. The adhesion of the curable composition to the surface of the substrate was evaluated daily for a three day period by manually peeling away the cured elastomer from the substrate over an area of at least about 5 square centimeters. If any failure was observed at the interface between the elastomer and the substrate rather than within the elastomer layer the failure was rated as an adhesive failure (AF) or a mixed failure (MF). Only those failure occurring totally within the elastomer layer were rated cohesive failures (CF).

The aluminum panels were type 2024 aluminum, either bare or Alclad, and were supplied by the Q Panel Company. Analysis of the surface of representative panels by X-ray photoelectron spectroscopy revealed that from 42 to 47 percent of the atoms present on the surface of the panels were carbon atoms. The contact angle of water on the test surface of the panels was about 75 degrees. These data indicate that the surfaces of the panels contained a substantial concentration of organic impurities.

By comparison after the test surfaces of the panels had been wiped with an organic solvent. only 36 percent of the atoms on the surface were carbon and the contact angle of water decreased to 55 degrees.

EXAMPLE 1

This example compares the adhesion to Alclad aluminum panels exhibited by 3 adhesion promoter compositions of this invention with the adhesion achieved using the ingredients individually.

The two embodiments of ingredient B described in this example were prepared by heating in a glass reactor a mixture containing either the diallyl ether of trimethylolpropane and 1,2- bis(trimethoxysilyl)ethane in a molar ratio of 1:1. respectively, (referred to hereinafter as B1) or the monoallyl ether of trimethylolpropane and 1,2-bis(trimethoxysilyl)ethane in a molar ratio of 1:2, respectively, referred to hereinafter as B2. Both reaction mixtures included 1 percent of tetrabutyl titanate, based on the total weight of the reaction mixture. and the reactor was equipped to condense and remove liquid that vaporized from the reaction mixture. Heating of the reaction mixture was continued until the temperature of the reaction mixture reached 150° C. in the case of the monoallyl ether or 160° C. in the case of the diallyl ether. Ingredients B1 and B2 were used as recovered from the reaction mixture without additional purification.

In each instance the amount of by-product methanol recovered during the reaction was substantially equal to the calculated value based on the amounts of organosilicon and organic compounds present.

A third embodiment of ingredient B, identified hereinafter as B3, was prepared by reacting 10 parts of vinyltrimethoxysilane with 15 parts of a trimethylsiloxy terminated polyorganosiloxane containing an average of 5 methylhydrogensiloxne units and 3 dimethylsiloxane units per molecule and about 0.8 percent of silicon bonded hydrogen atoms. The two compounds were allowed to react under ambient conditions for three days in the presence of 0.1 part of a chloroplatinic acid complex of divinyltetramethyldisiloxane diluted with dimethylvinylsiloxy terminated polydimethylsiloxane to provide 0.7 weight percent platinum.

For comparative purposes curable compositions outside the scope of this invention were prepared using composition I described hereinabove with 1 percent of B1, B2 or 1,2- bis(trimethoxysilyl)ethane (A1) added as the adhesion promoter. Compounds B1 and B2 each contained 1 percent by weight of tetrabutyl titanate that was present during preparation of the compounds. One-tenth of one percent by weight of tetrabutyl titanate was added to the composition containing compound A1. In each instance adhesive failure was obtained after one, two and three days of curing under ambient conditions.

Curable compositions of this invention were prepared by blending composition I with (1) one percent of B1 (which contained one percent of tetrabutyl titanate). (2) one percent of A1 and (3) an additional 0.1 percent, based on the weight of the final composition, of tetrabutyl titanate. This is equivalent to a molar ratio of A1 to B1 of 1.6. The composition exhibited 100 percent cohesive failure on Alclad aluminum panels after curing for one, two or three days.

Cohesive failure was also observed when the concentration of ingredient A1 was increased to 3 percent, based on the weight of the composition, which is equivalent to a molar ratio of A1 to B1 of 3.2.

For purposes of comparison the molar ratio of A1 to B1 was increased to 8 by increasing the concentration of A1 to 5 percent, based on the weight of composition I and maintaining the concentration of B1 at 1 percent. The composition exhibited cohesive failure after curing for one day under ambient conditions. After a second day under the same conditions the cured composition exhibited adhesive failure.

The reason for this phenomenon is believed be an excessive amount of unreacted A1 in the cured composition. which has been shown to be a poor adhesion promoter for compositions that are cured at room temperature.

Additional compositions of this invention were prepared by blending curable composition I defined hereinabove with the amounts (in percent by weight) of ingredients A1, B2 and B3 listed in the following table in addition to 0.1 percent of tetrabutyl titanate. The type of adhesion obtained following three days of curing under ambient conditions is also listed in the table. AF represents adhesive failure, MF represents a mixture of adhesive and cohesive failure and CF represents complete cohesive failure, i.e. failure occurred completely within the elastomer rather than at the interface between the elastomer and the substrate.

| Sample No. | A1 | B1 | B2 | B3 | Type of Failure |
|---|---|---|---|---|---|
| 1* | 1 | — | — | — | AF |
| 2* | — | 1 | — | — | AF |
| 3* | — | — | 1 | — | AF |
| 4 | 1 | 1 | — | — | CF |
| 5 | 1 | 3 | — | — | CF |
| 6* | 1 | 5 | — | — | AF |
| 7 | 1 | — | 3 | — | CF |
| 6 | 3 | — | 3 | — | CF |
| 9 | 5 | — | 3 | — | CF |
| 10 | 1 | — | — | 1 | CF |
| 11 | 5 | — | — | 1 | CF |

*signifies a comparative sample not within the scope of this invention

EXAMPLE 2

This example demonstrates the variation in bond strength to bare aluminum observed by varying the type and concentration of ingredient B of the present compositions and the catalyst concentration.

Bare type 2024 aluminum panels were coated with composition I and evaluated after two days of curing as described in the preceding Example 1. The types and concentrations (in parts) of ingredients A1, B1, B'1, and B3, which are identified in the preceding example 1. and tetrabutyl titanate, are listed in the following table.

| Sample | A1 | B1 | B2 | B3 | Catalyst | Adhesion |
|---|---|---|---|---|---|---|
| 12 | 1 | 1 | — | — | 0.1 | AF |
| 13 | 3 | 1 | — | — | 0.1 | AF |
| 14 | 1 | — | 3 | — | 0.1 | CF |
| 15 | 3 | — | 3 | — | 0.05 | CF |
| 16 | 3 | — | 3 | — | 0.1 | MF |

These data indicate that while all of the compositions tested provided bonding to bare aluminum when cured under ambient conditions, some selectivity may be required in the choice of ingredient B and catalyst concentration to achieve cohesive bonding to bare aluminum at room temperature. The selection of other organosilicon compounds as ingredient B for these preferred compositions can be determined with a minimum of experimentation.

EXAMPLE 3 (COMPARATIVE EXAMPLE)

This example demonstrates the uniqueness of 1,2-bis(-trialkoxysilyl)ethanes with respect to the ability of these compounds to interact with other organosilicon compounds to provide cohesive bonding of room temperature curable polyorganosiloxane compositions to metal substrates.

Curable composition I defined hereinbefore was combined with with 1 percent by weight, based on the weight of composition I, of ingredient B1 ; 1, 3, or 5 percent of 1,3- bis(trimethoxysilyl)propane; and 0.1 percent of tetrabutyl titanate. The resultant compositions were coated on Alclad aluminum panels and cured for three days as described in the preceding Example 1. All of the samples exhibited adhesive failure, indicating that higher homologs of ingredient A of the present compositions cannot be substituted for ingredient A.

In a similar manner, when 1.6-bis-(trimethoxysilyl)-hexane was substituted for the propane homolog at concentrations of 1.2, 3, and 6 percent, based on the weight of composition I, all of the samples exhibited adhesive failure after curing for three days under ambient conditions.

EXAMPLE 4

This example describes additional embodiments of the present curable compositions.

Curable compositions of this invention were prepared by blending curable composition I described hereinbefore with 1 weight percent of 1,2-bis(trimethoxysilyl)ethane, 0.05 percent by weight of tetrabutyl titanate and one of the following compounds in an amount equivalent to 0.06 weight percent of $CH_2=CH-$ based on the weight of curable composition I. This is equal to the concentration of $CH_2=CH-$ provided by one percent by weight of compound B1 described in the preceding example 1. Each of the curable compositions also contained 1 percent by weight of tetrabutyl titanate.

The compounds used as ingredient B were:
6-trimethoxysilyl-1,2-hexene
allyltrimethoxysilane
vinyltrimethoxysilane
a reaction product of equimolar amounts of the diallyl ether of trimethylolpropane and methyltrimethoxysilane. prepared as described hereinbefore for ingredient B1.
a reaction product of the monoallyl ether of trimethylolpropane and methyl orthosilicate in a molar ratio of 2:1, respectively. prepared as described hereinbefore for ingredient B2.
a reaction product of the monoallyl ether of trimethylolpropane and methyltrimethoxysilane in a molar ratio of 2:1, respectively. prepared as described hereinbefore for ingredient B2.

The resultant curable compositions of this invention were coated on Alclad aluminum panels as described hereinbefore and allowed to cure for one day under ambient conditions. At the end of this period all of the cured elastomers exhibited cohesive failure to the panels, which had not been cleaned or otherwise treated prior to being coated.

For comparative purposes curable compositions were prepared and coated as described in the foregoing Example 1 using composition I and each of the six embodiments of ingredient B described in the first part of this example (Example 4). The concentration of each embodiment was equivalent to 0.06 weight of $CH_2=CH-$ group. based on the weight of composition I, and the compositions were coated on Alclad aluminum panels that were not cleaned prior to being coated. In every instance adhesive failure was observed following three days of curing under ambient conditions. This demonstrates that these embodiments of ingredient B must be combined with an embodiment of ingredient A of the present compositions to achieve cohesive bonding at room temperature to substrates that have not been cleaned prior to being coated.

EXAMPLE 5

This example demonstrates the ability of the present adhesion promoters to cohesively bond curable silicone elastomer compositions to aluminum at elevated curing temperatures.

A curable composition of this invention was prepared as described in the preceding example 1 using 100 parts by weight of curable composition I with 1 part of A1, 1 part of B1 and 0.05 part of tetrabutyl titanate. The composition was coated on the same type of Alclad aluminum panel described in example 1 and the coated panel was heated for 3.5 hours at 100 degrees C. to cure the composition. After cooling to ambient temperature the cured elastomer exhibited 100 cohesive failure.

That which is claimed is:

1. A composition which reacts to form a cured silicone elastomer capable of cohesively bonding to inorganic substrates, said composition comprising the product obtained by blending to homogeniety
   A. a curable polyorganosiloxane,
   B. a crosslinking agent for curing said polyorganosiloxane, and
   C. a liquid adhesion promoter that is miscible with (A) and (B) and consists essentially of
   (1) a first organosilicon compound of the general formula $(RO)_3SiCH_2CH_2Si(OR)_3$, where R represents an alkyl or haloalkyl radical containing from 1 to 8 carbon atoms, inclusive;
   (2) an second organosilicon compound containing in each molecule at least one silicon-bonded group represented by X and at least one silicon-bonded group represented by Y, where X represents hydroxyl or a group that is hydrolyzable to a hydroxyl group, Y is selected from the group consisting of X, hydrogen and organofunctional radicals and reacts with said curable polyorganosiloxane and/or said crosslinking agent; and
   (3) a catalyst for the reaction of said X group with said substrate or the alkoxy groups of said first organosilicon compound and the reaction of said Y group,
with the proviso that said second organosilicon compound is not represented by said general formula, and said organofunctional radicals are bonded to silicon by means of a silicon-carbon bond.

2. A composition according to claim 1 where said curable polyorganosiloxane and crosslinking agent react at room temperature, R is methyl or ethyl, the substrate is metallic, X is hydroxyl or alkoxy containing from 1 to 10 carbon atoms, and Y is alkoxy, hydrogen, or an organofunctional radical selected from the group consisting of terminally unsaturated alkenyl radicals and radicals of the general formula $Z'''—$where $R'''$ represents alkylene containing at least 3 carbon atoms and Z represents acryloxy, methacryloxy, glycidoxy, mercaptos, amino and N-aminoalkylamino.

3. A composition according to claim 2 where said second organosilicon compound is selected from the group consisting of (a) silanes of the general formula $Y_aSiX_{(4-a)}$ or $Y_aR''SiX_{(3-a)}$ and partial hydrolysis products of said silanes, where a represents an integer from 1 to 3, inclusive, and $R''$ represents a monovalent hydrocarbon radical containing from 1 to about 8 carbon atoms, (b) reaction products of said silanes with at least one polyorganosiloxane containing an average of two or more silicon atoms per molecule that are linked by oxygen atoms, the remaining valences of the silicon atoms being satisfied by Y groups and monovalent hydrocarbon radicals, and (c) reaction products of said polyorganosiloxanes with organic compounds containing at least one Y group and at least one group that reacts with said polyorganosiloxane.

4. A composition according to claim 2 where said composition is curable by a platinum catalyzed hydrosilation reaction, said catalyst is a titanium compound, X is alkoxy, Y is vinyl, allyl or hydrogen and the molar ratio of said first organosilicon compound to said second organosilicon compound is from 0.1 to 7.

5. A composition according to claim 4 where said second organosilicon compound is selected form the group consisting of vinyltrialkoxysilanes, allyltrialkoxysilanes, and reaction products of (1) silanes of the formula $(R'')_n Si(OR^*)_{4-n}$, where n is 0 or 1. $R^*$ is methyl or ethyl and $R''$ is methyl, ethyl or $(R^*O)_3SiCH_2CH_2—$, with (2) an organohydrogensiloxane or an alcohol containing at least one terminally unsaturated alkenyl radical.

6. A composition according to claim 5 where said first organosilicon compound is 1,2-bis(trimethoxysilyl)ethane, said second organosilicon compound is selected from the group consisting of vinyltrimethoxysilane, allyltrimethoxysilane, reaction products of the mono- or diallyl ether of trimethylolpropane with an organosilicon compound selected from the group consisting of methyltrimethoxysilane, methyl orthosilicate and 1,2-bis(trimethoxysilyl)ethane, the curable polyorganosiloxane is a vinyl terminated polydiorganosiloxane and the crosslinking agent is an organohydrogensiloxane containing an average of at least three silicon bonded hydrogen atoms per molecule.

7. A method for promoting adhesion of a cured silicone elastomer to an inorganic substrate, said method comprising incorporating into a curable precursor of said elastomer a miscible liquid adhesion promoter consisting essentially of the product obtained by blending to homogeniety
   A. a first organosilicon compound of the general formula $(RO)_3SiCH_2CH_2Si(OR)_3$, where R represents an alkyl or haloalkyl radical containing from 1 to 8 carbon atoms, inclusive;
   B. a second organosilicon compound containing at least one silicon-bonded group per molecule represented by X and at least one silicon-bonded group per molecule represented by Y, where X represents hydroxyl or a group that is hydrolyzable to a hydroxyl group, Y is selected from the group consisting of X, hydrogen and organofunctional radicals, and reacts with the ingredients of said curable precursor; and
   C. a catalyst in an amount sufficient to promote the reaction of said X groups with said substrate or the alkoxy groups of said first organosilicon compound and the reaction of said Y group, with the proviso that said second organosilicon compound does not correspond to said general formula.

8. A method according to claim 7 where said curable polyorganosiloxane and crosslinking agent react at room temperature, R is methyl or ethyl, the substrate is metallic, X is hydroxyl or alkoxy containing from 1 to 10 carbon atoms, and Y is alkoxy, hydrogen, or an organofunctional radical selected from the group consisting of terminally unsaturated alkenyl radicals and radicals of the general formula $ZR'''—$, where $R'''$ represents alkylene containing at least 3 carbon atoms and Z represents acryloxy, methacryloxy, glycidoxy, mercapto, amino and N-aminoalkylamino.

9. A method according to claim 8 where said composition is curable by a platinum catalyzed hydrosilation reaction, said catalyst is a titanium compound, X is alkoxy, Y is vinyl, allyl or hydrogen, and the molar ratio of said first organosilicon compound to said second organosilicon compound is from 0.1 to 7.

10. A method according to claim 9 where said second organosilicon compound is selected from the group consisting of vinyltrialkoxysilanes, allyltrialkoxysilanes, and reaction products of (1) silanes of the formula $(R'')_n Si(OR^*)_{4-n}$, where n is 0 or 1, $R^*$ is methyl or ethyl, and $R''$ is methyl, ethyl or $(R^*O)_3SiCH_2CH_2—$, with 2) an organohydrogensiloxane or an alcohol containing at least one terminally unsaturated alkenyl radical.

11. A method according to claim 10 where said first organosilicon compound is 1,2-bis(trimethoxysilyl)ethane, said second organosilicon compound is selected from the group consisting of vinyltrimethoxysilane, allyltrimethoxysilane, reaction products of the mono- or diallyl ether of trimethylolpropane with an organosilicon compound selected from the group consisting of methyltrimethoxysilane methyl orthosilicate and 1,2-bis(trimethoxysilyl)ethane, the curable polyorganosiloxane is a vinyl terminated polydiorganosiloxane and the curing agent is an organohydrogensiloxane containing an average of at least three silicon bonded hydrogen atoms per molecule.

12. A method according to claim 8 where said second organosilicon compound is selected from the group consisting of (a) silanes of the general formula $Y_aSiX_{(4-a)}$ or $Y_aR''SiX_{(3-a)}$ and partial hydrolysis products of said silanes, where a represents an integer from 1 to 3, inclusive, and $R''$ represents a monovalent hydrocarbon radical containing from 1 to about 8 carbon atoms, (b) reaction products of said silanes with at least one polyorganosiloxane containing an average of two or more silicon atoms per molecule that are linked by oxygen atoms, the remaining valences of the silicon atoms being satisfied by Y groups and monovalent hydrocarbon radicals, and (c) reaction products of said polyorganosiloxanes with organic compounds containing at least one Y group and at least one group that reacts with said polyorganosiloxane.

\* \* \* \* \*